Sept. 21, 1954  G. M. QUIAT  2,689,481
TIRE PRESSURE INDICATOR
Filed April 24, 1952
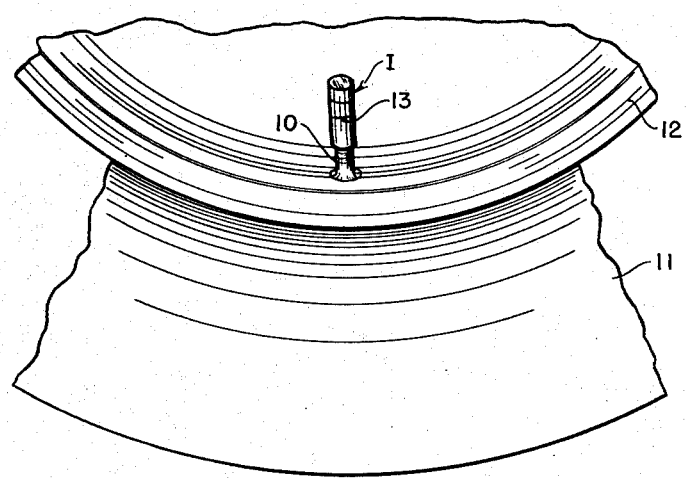
FIG.-1
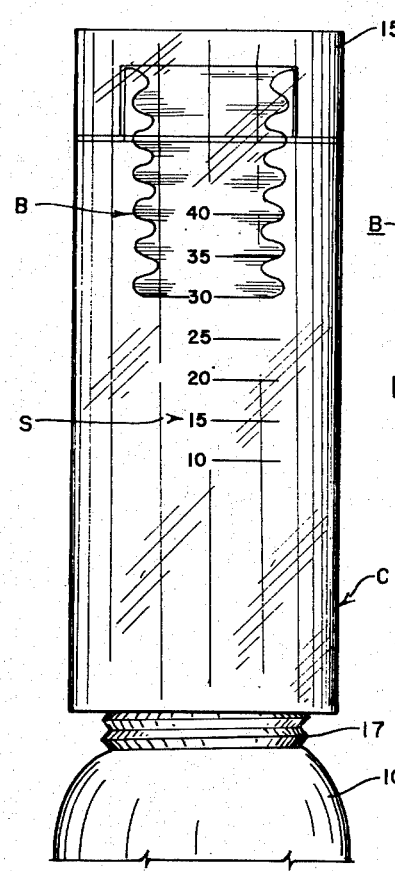
FIG.-2
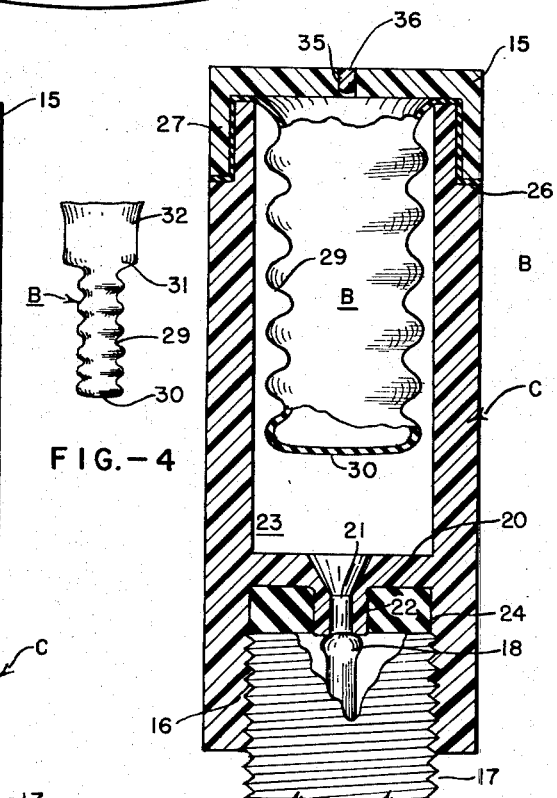
FIG.-4
FIG.-3
INVENTOR.
GERALD M. QUIAT
BY
Lamphere + Van Valkenburgh
ATTORNEYS Patented Sept. 21, 1954

2,689,481

UNITED STATES PATENT OFFICE 2,689,481

TIRE PRESSURE INDICATOR

Gerald M. Quiat, Denver, Colo.

Application April 24, 1952, Serial No. 284,125

4 Claims. (Cl. 73—390)

This invention relates to tire pressure indicators, and more particularly to such an indicator which may be placed on the valve stem of a pneumatic tire of an automobile, truck, or the like.

In the operation of an automobile, truck, or the like, it has been customary to check the pressure of the tires by testing each tire with a hand operated pressure gauge, or a pressure gauge built into a hose which supplies air. Such testing requires that the valve cap be unscrewed, and the gauge and hose connection applied to the valve stem, and such testing also usually requires that the operator drive into a filling station or the like, which may unnecessarily take up the time of the attendant, as when the operator wishes only to have the tires checked. Often the operator wishes to know whether adequate pressure is in the tires without the necessity of driving into a filling station, or when a filling station is not available. For instance, when driving across desert country, it may happen that the pressure in the tires will be correct for early morning or late evening driving, during cool periods of the day, but when driving across sand or the like during the heat of the day, the pressure in the tires may become excessive and cause blowouts or other damage thereto. Under such circumstances, when a check of the air pressure in the tires must be made, the automobile or truck may be miles away from a filling station or garage.

In my copending application (now abandoned) Serial No. 157,104, filed April 20, 1950, and entitled "Tire Pressure Indicator," there is disclosed a tire pressure indicator which includes a pre-stressed spring, a resilient sack within the spring, and a housing having a shoulder against which a flange formed by one or two coils at the lower end of the spring is clamped, a flange at the lower end of the sack being held against the spring flange by a washer. The tire pressure indicator of the present invention is used for the same general purpose, and consequently many of the objects of the present invention and those of my application Serial No. 157,194 are the same. However, the tire pressure indicator of the present invention does not require any spring, involves less parts, is more readily assembled than the indicator of my application Serial No. 157,104, as well as differing therefrom in other particulars.

Thus, among the objects of this invention are to provide a tire pressure indicator which may be placed on the valve stem of the tire of an automobile, truck, or the like; to provide such an indicator which will continuously indicate the pressure in the tire; to provide such an indicator which may be accurately read at a glance; to provide such an indicator which does not require a valve cap or the like to be removed to permit the pressure in the tire to be ascertained; to provide such an indicator which can also be used for testing the pressure in the tire, when pressure adjustments are made to accommodate various driving conditions; to provide such an indicator which may be subjected to full tire pressure, but will withstand such pressure with a minimum danger of leakage; to provide such an indicator which is relatively short in length and therefore does not tend to protrude an undue distance from the valve stem; to provide such a tire pressure indicator which does not require a spring; to provide such a tire pressure indicator which involves a minimum number of parts and is readily assembled, and therefore may be made at a relatively low cost; and to provide such a tire pressure indicator which is relatively durable and has a relatively long life expectancy.

Additional objects, and the novel features of this invention, will become apparent from the description which follows, taken in connection with the accompanying drawing, in which:

Fig. 1 is a side elevation of a tire pressure indicator constructed in accordance with this invention, installed on the upper end of a valve stem of an automobile tire, the latter being shown only fragmentarily;

Fig. 2 is a side elevation, on an enlarged scale, of the indicator of Fig. 1, but with slightly different indicating marks;

Fig. 3 is a vertical section of the indicator, on the scale of Fig. 2; and

Fig. 4 is a side elevation, on a reduced scale, of a rubber bellows forming a part of the indicator.

As illustrated in Fig. 1, a tire pressure indicator I, constructed in accordance with this invention, may be mounted on a valve stem 10 of a tire 11, in turn mounted on a wheel 12 of an automobile or the like. The indicator I may be provided with a single indicating mark 13, so that the operator may tell at a glance, in a manner hereinafter explained, whether or not the pressure in the tire is equal to, lower than or greater than the desired pressure for the tire. When the single indicating mark 13 is used, it is preferably indicative of the pressure recommended for the tire by the automobile manufacturer. Thus, indicators for different automobiles may indicate different single pressures for different automobiles and also for different models, when the size of a tire or other considerations result in a manufacturer's recommendation of a different tire pressure.

Or, the indicator may, as in Fig. 2, be provided with a scale S, or series of marks, so that the pressure may be read by the operator. The range of the scale S, such as from 10 or 20 lbs. per square inch to 40 lbs. per square inch for passenger automobile tires, and a higher range for trucks, may be molded, stamped, etched, printed or placed on the indicator in any other desired manner, and is preferably calibrated in a manner explained later. It will be understood, of course, that the indication of the tire pressure will be obtained in the same way, irrespective of whether a single indicating mark or a scale is used, but that the manner in which calibration is achieved may differ.

The tire pressure indicator of this invention may comprise generally, as in Fig. 3, a hollow, cylindrical casing C, formed entirely or partly of a suitable plastic or other transparent material and having an open lower end and an upper end closed by a sack or bellows B and a cap 15. The open lower end of the casing C is provided with interior threads 16 adapted to engage corresponding threads 17 formed on a conventional neck of the valve stem 10, in which is disposed a pin 19 having a transversely flattened upper end and adapted to be pressed downwardly to open a conventional valve (not shown) contained within the stem 10. The stem 10, of course, extends from the tube of a tire mounted on the the wheel of an automobile, truck, or the like.

Adjacent threads 16, casing C may be provided with a partition 20 having a hole 21 extending through a central nipple 22 adapted to engage and depress the valve pin 19, a washer 24 surrounding nipple 22 to engage the upper end of stem 10 and form an air-tight seal therewith. Above partition 20, a bore 25 of casing C may have substantially the same diameter as the bore at threads 16. On the outside, a shoulder 26 may be formed, to accommodate an annular depending flange 27 of cap 15. The bellows B is formed of rubber or other suitable resilient material and provided with corrugations 29 extending from its closed flat lower end 30, for a distance slightly less than the distance between partition 20 and the upper end of casing C, to a shoulder 31. As in Fig. 4, the upper end 32 of bellows B, above shoulder 31, is preferably smooth and has an outer diameter corresponding to the inner diameter of shoulder 26 of casing C, the upper end 32 of the bellows being tubular and, prior to assembly, longer than finally needed, for assembly purposes.

For assembly of the indicator of this invention, the bellows B is merely inserted within the casing C, until shoulder 31 engages the upper end of the casing, whereupon the tubular upper end 32 of the bellows is folded back over itself and onto the casing C. This forms a tubular portion which depends from the outer periphery of the shoulder and which is disposed in spaced relation to and surrounds the upper end of the corrugations 29, such tubular portion thereby extending along the outside of casing C at the upper end thereof. Preferably, suitable cement has been applied to the outside of casing shoulder 26, and after the cement has set, or at any other desired time, the end 32 of the bellows B may be cut off at the casing shoulder. Then, after cement is applied to the exposed surfaces of the bellows or to the interior of the cap 15, the cap is pushed down over the reversed end of the bellows, and the cement permitted to set to form an air-tight connection.

The corrugations of the bellows B permit the bellows to expand and contract, in accordance with the differential in pressure between the inside and outside of the bellows, since the casing C defines a pressure chamber and the bellows is provided with means, such as air pressure within, which elastically resists the pressure of air within the casing C. Thus, as the pressure around the bellows B increases, the bellows will contract, and the closed lower end 30 of the bellows, which may be painted or otherwise marked to provide ease in observation thereof, will move to a position corresponding to such pressure. As will be evident, the exact position of the lower end 30 of bellows B, for any specific tire pressure, will depend upon the pressure inside the bellows B, and when a single indicating mark is used, the indicator may be calibrated by connecting the lower end of the casing to air at the desired pressure and then placing the indicating mark, such as mark 13 of Fig. 1, at a position corresponding to that assumed by the lower end 30 of the bellows at such pressure. However, if a range of pressures is to be indicated, and particularly when the indicating marks are placed on the casing during molding or the like, the indicator may be calibrated by a variation of the pressure within the bellows.

Such pressure within the bellows B may be conveniently obtained by providing a small hole 35 in the cap C, so that the indicator, after assembly, may be placed in a small pressure chamber and the lower end then subjected to a predetermined pressure. By changing the pressure in the chamber, the lower end of the bellows may be moved to coincide with the mark indicating the pressure to which the outside of the bellows is subjected. Then, the hole 35 may be sealed, as by a suitable cement 36, so that the bellows B will contain air (or other gas) at the calibrating pressure.

The tire indicator of this invention may be relatively small, in comparison with the scale of the drawing, since for an indicator having the range shown, the indicator need not be more than about 1½ inches long and about ½ inch in outer diameter. Also, the corrugated portion of bellows S may be about ¾ inch in length and about ¼ inch in diameter. The thickness of washer 24 and the length of threads 16 are preferably such that the indicator must be screwed onto the valve stem for several threads before the valve pin 19 is depressed, so that when the indicator is placed on the tire or taken off, only a minute quantity of air will tend to be lost.

From the foregoing, it will be evident that the tire indicator of this invention fulfills to a marked degree the requirements and objects hereinbefore set forth. It is particularly adapted to be placed on a valve stem and left in position, and since the casing is made at least partly of transparent material, the pressure within the tire is read easily, at a glance. Due to the parts being relatively few, it is relatively inexpensive to manufacture, and also may be assembled with ease. The shoulder and smooth tubular upper end of bellows S insures not only a comparatively accurate positioning of the closed lower end, but also permits the casing, bellows and cap to be assembled with ease and rapidity. The indicator is also readily calibrated or adjusted for different pressure ranges. The hole in the cap permits air or gas under pressure to be supplied to the bellows, thus insuring accuracy of calibration and adjustment, while the hole is readily sealed.

It will be understood that various changes may be made in the indicator, including the use of different materials and different sizes or shapes for various parts. Thus, the casing may be varied in size and shape, and in other ways, such as being made of metal or other non-transparent material, with a transparent window or windows provided for observation of the pressure reading. Also, when the casing is composite, such as when made partly of transparent plastic and partly of metal, the plastic portion may be molded onto the metal portion, and other joints, such as a tongue and groove or dovetail joint, may be utilized. The exterior of the casing may be elliptical in shape and the bore round, or the exterior may be round and the bore, above the threads, provided with a shape other than round, such as elliptical. The bellows preferably has a cylindrical shape, although an elliptical or other shaped bellows may be utilized if desired. The nipple 22 may be provided with more than one bleed hole, and also may have a different shape than that shown, and the hole 21 off-center, so as to provide a centrally disposed point on the underside adapted to engage the valve pin. If desired, a metal insert provided with threads may be inserted or molded into the lower end of the casing.

It will be further understood that other embodiments may exist, and various changes made therein, all without departing from the spirit and scope of this invention.

What is claimed is:

1. A pressure indicator, comprising a generally tubular casing having an elongated bore open at both ends thereof; means at one end of said bore for engaging a tire valve stem to hold the valve open and admit tire pressure to said bore; a resilient, rubber-like tubular bellows having a closed end portion and an open end portion, the closed end portion being received in said bore and the open end portion of said bellows being in continuous contact with a circumferential surface portion of said casing around the remaining open end of said casing; means closing the last said casing end and holding the said end portion of said bellows in sealing relation to said circumferential surface portion of said casing, said bellows including means elastically resisting forces tending to contract the volume of said bellows; and said casing being transparent at least in part so that the contraction in volume of said bellows due to pressure is exhibited as a function of tire pressure when such pressure is admitted to the casing bore.

2. A pressure indicator for a tire or the like having a tube provided with a valve stem and a valve operating pin extending therein, comprising an elongated casing defining a pressure chamber and formed at least in part of transparent material, said casing having an open upper end and an open lower end and having means for engaging said valve stem pin to permit tire pressure to be transmitted to said pressure chamber, the lower end of said casing being provided with means for engagement with said valve stem; a bellows formed of resilient, rubber-like material and having a closed lower end, an open upper end with a transverse shoulder and a corrugated side wall portion between its closed lower end and said shoulder, said bellows having a tubular portion depending from the outer periphery of said shoulder and said tubular portion having a greater diameter than and surrounding the upper end of said corrugated side wall portion, in spaced relation thereto, said bellows extending into said chamber with said shoulder engaging the upper end of said casing and said tubular portion extending along the outside of said casing wall at the upper end thereof; means within said bellows for elastically resisting pressure of air within said chamber; and a cap closing the upper end of said casing and having a depending flange maintaining the said tubular portion of said bellows in contact with the said wall of said casing, said bellows being sealed to said casing and to said cap.

3. In a pressure indicator for a tire or the like as defined in claim 2, wherein said casing is provided with a shoulder on the outside to which the folded portion of said bellows extends and which forms a space to accommodate the flange of said cap.

4. In a pressure indicator for a tire or the like having a tube provided with a valve stem and a valve operating pin extending therein, an elongated casing defining a pressure chamber and formed at least in part of transparent material and having a lower end and an upper end with means at the lower end for engaging said valve stem pin to permit tire pressure to be transmitted to the upper portion of said casing, the lower end of said casing also having means for engagement with said valve stem and said casing having an opening at its upper end; a bellows formed of resilient, rubber-like material and having a closed lower end, an open upper end and a corrugated side wall portion therebetween, said bellows extending into said chamber with the outside of its upper end engaging the upper end of said casing around the circumference of said opening; means within said bellows for elastically resisting pressure of air within said chamber; and means on said casing closing the upper open end of said bellows.

References Cited in the file of this patent

UNITED STATES PATENTS

| Number | Name | Date |
|--------|------|------|
| 984,153 | Olsen | Feb. 14, 1911 |
| 1,856,199 | Tagle et al. | May 3, 1932 |
| 2,225,675 | West | Dec. 24, 1940 |
| 2,417,449 | Rubin | Mar. 18, 1947 |
| 2,438,413 | Renner | Mar. 23, 1948 |